March 29, 1955  D. M. PEARL  2,705,268
VEHICLE BACK-UP SIGNALING DEVICE
Filed Jan. 18, 1952
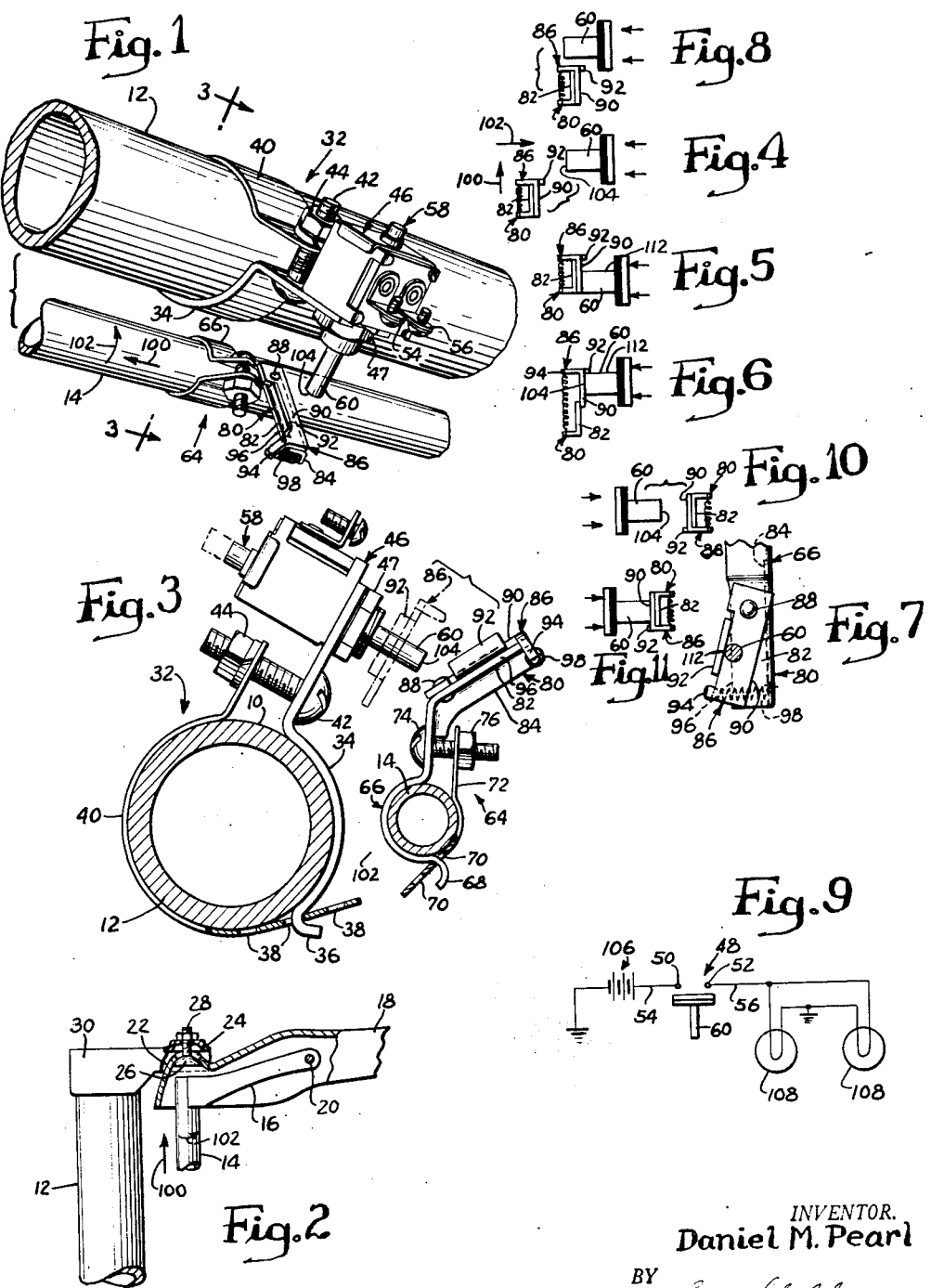
INVENTOR.
Daniel M. Pearl
BY
Louis Sheldon
Attorney

United States Patent Office 2,705,268
Patented Mar. 29, 1955

2,705,268

VEHICLE BACK-UP SIGNALING DEVICE

Daniel M. Pearl, Chicago, Ill., assignor to Darwin Products, Inc., Chicago, Ill., a corporation of Illinois Application January 18, 1952, Serial No. 267,100

9 Claims. (Cl. 200—61.88)

This invention relates to automobile back-up warning signaling devices and is concerned more particularly with a device including an electric switch for signaling, by light, sound or otherwise, to those who are at the rear of an automobile or other vehicle when the vehicle is about to back up and is backing up.

Many motor vehicles have alongside the steering column an external gear shift post which reciprocates along its axis as well as rotates, in response to corresponding movements of the gear shift lever. When the lever is shifted to reverse gear, the lever is first swung upward, raising the post out of neutral position, and is then turned to reverse gear position, the post turning therewith. In some of these cars the post remains in this elevated position as long as the vehicle is in reverse gear, and neutral is again established by reversing the movements of the lever. In the remainder of such vehicles the gear shift lever and post, after reaching reverse gear positions, settle down substantially to the levels occupied by them when in second gear position, and the driver reestablishes neutral by reversing these three movements of the lever.

In fully manual shift (i. e., conventional) vehicles, reverse gear is established pursuant to manual counter-clockwise movement of the gear shift lever. In automatic shift vehicles, reverse gear is established pursuant to manual clockwise movement of the gear shift lever.

An object of the present invention is to provide switch-control means which is equally adaptable for use with the above-noted types of gear shift mechanisms.

An additional object is to provide a switch-actuating means and a signal controlled thereby, wherein the signal is inoperative when the gear shift lever is moved to any position other than reverse gear position, but is operative in reverse gear position regardless whether the gear shift post does or does not descend.

Further objects and advantages of the invention will appear as the description proceeds.

The invention will be better understood upon reference to the following description and accompanying drawing, in which:

Fig. 1 is a fragmentary perspective view of a steering column and adjacent external gear shift post of a conventional gear shift transmission vehicle with back-up light switch mechanism mounted thereon.

Fig. 2 is a fragmentary view, partly in section and partly in elevation, showing the same column and post and associated gear shift lever.

Fig. 3 is an enlarged view, partly in section and partly in elevation, taken as indicated by the line 3—3 in Fig. 1.

Fig. 4 is a diagrammatic view of the switch and actuator therefor, the parts occupying the same relative positions as in Fig. 1 and Fig. 3 (full lines), with the transmission in neutral gear.

Fig. 5 is a diagrammatic view showing the same parts in the relative positions occupied thereby when the vehicle is in reverse gear, corresponding to the relation of the parts indicated in dot-dash lines in Fig. 3; this is the final relation of the parts in the case of a gear shift post which does not descend while in reverse position, as well as the momentary relation in the case of a gear shift post which descends upon reaching reverse gear position.

Fig. 6 is a diagrammatic view showing the relation of the parts in a vehicle in which the gear shift post descends while in reverse gear position, upon completion of the descent of the post.

Fig. 7 is an enlarged sectional corresponding to Fig. 6 and showing in a different plane the change in relation resulting from descent of the gear shift post in reverse gear.

Fig. 8 is a diagrammatic view showing the relation of the parts when the vehicle is in second gear.

Fig. 9 is a schematic diagram of an electric circuit including a pair of back-up lights and the switch mechanism of my invention.

Fig. 10 is a diagrammatic view of the relation of the parts of my invention in a so-called automatic transmission vehicle when not in reverse gear.

Fig. 11 is a diagrammatic view of the parts of Fig. 10 in their relative positions when the automatic transmission vehicle is in reverse gear.

In conventional shift left-hand drive vehicles using the H system of shifting of the gear shift lever to establish neutral and the various forward speed and reverse speed transmission conditions, the driver establishes reverse gear by first swinging the lever toward the steering wheel and then turning the lever counter-clockwise (i. e., toward the front). In left-hand drive vehicles of the automatic transmission type, the driver establishes reverse gear manually simply by turning the lever clockwise. In right-hand drive cars the direction of motion of the lever to establish reverse gear is the opposite of that in left-hand drive practice. The present invention will be described for convenience with reference to left-hand drive vehicles, but obviously is applicable to both types.

Referring now more particularly to the drawing, there is shown at 12 an automobile steering column alongside which extends a gear shift post or rod 14 having a fixed arm 16 to the free end of which an intermediate part of a gear shift lever 18 is pivoted at 20 on an axis transverse to the post, the inner end of the lever having a part-spherical socket 22 slotted at 24 and engaged with the part-spherical head 26 of a swivel bolt 28 coaxial with the post and supported by a bracket 30 fixed to the upper end of the steering column.

The device involving features of the invention includes a clamp bracket unit or assembly 32 which, to facilitate its mounting, may comprise a preferably rigid bracket 34 adapted to partially embrace the steering column 12 and having a hook 36 adapted to enter a selected one of the slots 38 in a cooperating preferably manually bendable or flexible clamp band 40 having a hole adapted to register with a hole in the bracket for the reception of a screw 42 with which a nut 44 cooperates to clamp the unit firmly on the steering column. A switch housing 46 is fastened or clamped as at 47 to the bracket 34 and contains a plunger type switch 48 comprising a pair of contacts 50 and 52 connected to outside terminals 54 and 56, respectively, and a plunger 58 biased by a spring (not shown) in a direction to hold the switch open, with the plunger end 60 projecting out of the housing in a position to be actuated against the resistance of the spring to close the switch, as will appear.

A switch-actuating, or striker, assembly or unit 64 is mounted on the gear shift rod post 14 and includes a preferably rigid bracket 66 adapted to partially embrace the post and having an end hook 68 adapted to pass through a selected one of the holes 70 in a preferably manually bendable or flexible clamp band 72 having a hole adapted to register with a hole in the bracket 66 to receive a screw 74 with which a nut 76 cooperates to clamp the unit to the post.

My invention is universally adapted for use with an external gear shift post which does not settle while in reverse gear position, as in automatic transmission vehicles and some conventional shift vehicles, as well as with an external gear shift post which does so settle, as in some vehicles.

To this end, the striker unit 64 includes in addition to the bracket 66, with its offset end extension 80 formed with a flat portion 82 and a marginal flange 84 extending away from the switch housing 46, a striker plate 86 pivoted at 88 to the inner end portion of the extension and having a flat plunger-actuating striker portion 90 confronting the aforesaid portion 82 and between the latter and the switch housing, the plate also having, at the margin thereof remote from the flange, a lip 92 extending toward the switch housing and an outer end lug 94 extending in the opposite direction in confronting relation to the adjacent marginal edge 96 of the portion 82, and a tension spring 98 connected at its ends to the flange and lug, respectively, biases the lug toward the edge, which thus serves as a stop for the striker plate in one direction relative to the extension.

Figs. 1 to 9 illustrate the invention as applied to a conventional gear shift vehicle in which the gear shift post 14, upon reaching its reverse gear position, either remains stationary or descends to a slight extent and then comes to rest. The parts are shown in Figs. 1, 3 (full lines), and 4 in their relation when the vehicle is in neutral gear, and it will be noted that the plunger end 60 is fully projected so that the switch is open, and the striker plate 86 is laterally offset relative to the plunger end 60. To shift the transmission into reverse gear, the driver initially swings the gear shift lever 18 upward (Fig. 2), thus raising the gear shift post 14 and with it the striker unit 64 so as to locate the striker portion 90 in confronting relation to the plunger end 60, this movement being indicated in Figs. 1, 2 and 4 by the arrow 100. The gear shift lever 18 is then swung forward, thus rotating the gear shift post 14 in the direction indicated by the arrow 102 (Figs. 1, 2 and 3) the striker unit 64 thus moving in that direction as also shown in Fig. 4. During the first portion of this movement, the striker plate portion 90 moves into contact with the extremity 104 of the plunger end 60, and during the remainder of the movement said portion forces the plunger, against the resistance of its spring (not shown), to close the switch 48 as shown in Fig. 5. The switch 48 controls a circuit including the vehicle battery 106 and left and right lights 108 mounted at the rear of the vehicle, so that, the switch being now closed (Fig. 5), the lights will glow and thereby give warning that the vehicle is about to back up or is backing up.

If the gear shift post 14 of the vehicle does not descend upon reaching its reverse gear position, the parts will remain in the relation shown in Fig. 5 as long as the vehicle remains in reverse gear.

Should the vehicle be such that the post 14 descends in reverse gear position, the striker plate 86 will descend bodily only until its lip 92 comes into contact with the adjacent side 112 of the plunger end 60. As the descent of the post 14 continues, the striker plate 86 turns about its pivot 88, as indicated in Fig. 7, but its striker portion 90 remains in engagement with the extremity 104 of the plunger end 60 and maintains the plunger in switch-closing position as shown in Fig. 6. To shift the transmission out of reverse gear, the driver raises the gear shift lever 18 toward the steering wheel until the parts are in the relation shown in Fig. 5 and then pulls the lever toward him to the neutral position, thereby reestablishing the relation shown in Fig. 1, Fig. 3 (full lines) and Fig. 4, the switch 48 being thus automatically opened by the plunger spring.

In the case of a non-descending gear shift post, the gear shift lever is moved directly toward the driver to reestablish neutral gear and allow the plunger to be moved by its spring to open-switch position (Fig. 4).

When the transmission is shifted to second gear (Fig. 8), the striker unit moves clear of the plunger and thus it is clear that the switch is closed and the signal energized only when the transmission is in reverse gear.

In the case of an automatic shift transmission vehicle, the shift into and out of reverse is manual, but the directions of movement are reversed relative to those obtaining in a conventional shift transmission vehicle, so that the gear shift post is turned in the direction opposite to that indicated by the arrow 102 to establish reverse gear. Accordingly, the switch unit 32 and the striker unit 64 are mounted on the column 12 and post 14, respectively, in positions which are the reverse of those shown, in order that the striker unit may depress the plunger end 60 pursuant to clockwise movement (Figs. 1 and 3) of the post. Fig. 10 shows the relation of the parts in an automatic shift transmission vehicle when not in reverse gear, and it will be noted that the striker plate portion 90 is in confronting relation to the plunger end 60. To shift into reverse, the driver, as noted above, rotates the gear shift post clockwise, thereby shifting the striker unit to the position shown in Fig. 11, depressing the plunger and closing the switch 48 so that the lights 108 glow. When the lever is moved out of reverse gear position (into low gear), the plunger is automatically moved by its spring to an open-switch position (Fig. 10).

It is thus apparent that I have provided a back-up light switch control which will operate in any motor vehicle employing a steering column and an external gear shift rod, regardless whether the vehicle transmission is of the conventional or of the automatic shift type and regardless whether the gear shift rod remains in the position to which it is shifted by the gear shift lever or descends from that position while in reverse gear.

It is apparent also from the foregoing that the assemblies may be readily mounted on steering columns and gear shift posts of a variety of girths, and that they may be readily loosely adjusted to the proper relation pursuant to trial movements of the gear shift lever in reverse and second gear in a conventional transmission vehicle, or in and out of reverse gear in an automatic transmission vehicle, as the case may be, to insure proper functioning of the device, whereupon the screws may be securely tightened. The device may be mounted near the floor board or under the hood, or at any other convenient location.

Various modifications may suggest themselves to those skilled in the art without departing from the spirit of my invention. Hence I do not wish to be restricted to the specific forms shown or uses mentioned, except to the extent indicated in the appended claims, which are to be interpreted as broadly as state of the art will permit.

I claim:

1. In a motor vehicle having a steering column member, a gear shift post member extending alongside the column member, and a gear shift lever connected to the post member, the post member being rockable about its axis and reciprocable along its axis in response to corresponding movements of the lever, the lever and post member being adapted to settle downward slightly upon completion of the shift to reverse gear position: a pair of brackets having means for mounting the same on the respective members, a switch carried by one of said brackets and including a plunger spring-biased to open-switch position, a plunger actuator movably mounted on the other bracket and arranged to depress said plunger into closed-switch position pursuant to shift of the post member to reverse gear position, said actuator including detent means engageable with said plunger in a position to maintain said actuator in plunger-depressing position notwithstanding settling down of the post member while in reverse gear position, and means rendering said actuator inoperative when the post member is shifted to second gear position so that said actuator will not then depress said plunger to closed-switch position.

2. In a motor vehicle having a steering column member, a gear shift post member extending alongside the column member, and a gear shift lever connected to the post member, the post member being rockable about its axis and reciprocable along its axis in response to corresponding movements of the lever, the lever and post member being adapted to settle downward slightly upon completion of the shift to reverse gear position: a pair of brackets having means for mounting the same on the respective members, a switch carried by one of said brackets and including a plunger spring-biased to open-switch position, a plunger actuator movably mounted on the other bracket and arranged to depress said plunger into closed-switch position pursuant to shift of the post member to reverse gear position, said actuator including detent means engageable with said plunger in a position to maintain said actuator in plunger-depressing position notwithstanding settling down of the post member while in reverse gear position, and means biasing said actuator to a position clear of the path of said plunger when the post member is shifted to second gear position so that said actuator will not then depress said plunger to closed-switch position.

3. In a motor vehicle having a steering column, a gear shift post extending alongside the column, and a gear shift lever connected to the post, the post being rockable about its axis and reciprocable along its axis in response to corresponding movements of the lever, the lever and post being adapted to settle downward slightly upon completion of the shift to reverse gear position: a bracket having means for mounting the same on the column, a switch carried by said bracket and including a plunger spring-biased to open-switch position, a bracket having means for mounting the same on the post, a plunger actuator movably mounted on the second bracket and arranged to depress said plunger into closed-switch position pursuant to shift of the post to reverse gear position, said actuator including detent means engageable with said plunger in a position to retain said actuator in engagement with said plunger notwithstanding settling down of the post while in reverse gear position, and means biasing said actuator to a position clear of the path of said plunger when the post is shifted to second gear position so that said actuator will not then depress said plunger to closed-switch position.

4. In a motor vehicle having a steering column, a gear shift post extending alongside the column, and a gear shift lever connected to the post, the post being rockable about its axis and reciprocable along its axis in response to corresponding movements of the lever, the lever and post being adapted to settle downward slightly upon completion of the shift to reverse gear position: a bracket having means for mounting the same on the column, a switch carried by said bracket and including a plunger spring-biased to open-switch position, a bracket having means for mounting the same on the post, a plunger actuator movably mounted on the second bracket and arranged to depress said plunger into closed-switch position pursuant to shift of the post to reverse gear position, said actuator including detent means engageable with said plunger in a position to retain said actuator in engagement with said plunger notwithstanding settling down of the post while in reverse gear position, and means rendering said actuator inoperative when the post is shifted to second gear position so that said actuator will not then depress said plunger to closed-switch position.

5. In a motor vehicle having a steering column, a gear shift post extending alongside the column, and a gear shift lever connected to the post, the post being rockable about its axis and reciprocable along its axis in response to corresponding movements of the lever, the lever and post being adapted to settle downward slightly upon completion of the shift to reverse gear position: a bracket having means for mounting the same on the column, a switch carried by said bracket and including a plunger spring-biased to open-switch position, a bracket having means for mounting the same on the post, a plunger actuator pivoted to and backed by the second bracket and having a portion arranged to engage an end of and depress said plunger into closed-switch position pursuant to shift of the post to reverse gear position, said actuator having a marginal lip engageable with a side of said plunger in a position to retain said portion in engagement with said plunger end notwithstanding settling down of the post while in reverse gear position, and means locating said actuator in a position in which said actuator is incapable of depressing said plunger to closed-switch position when the post is shifted to second gear position.

6. In a motor vehicle having a steering column, a gear shift post extending alongside the column, and a gear shift lever connected to the post, the post being rockable about its axis and reciprocable along its axis in response to corresponding movements of the lever, the lever and post being adapted to settle downward slightly upon completion of the shift to reverse gear position: a bracket having means for mounting the same on the column, a switch carried by said bracket and including a plunger spring-biased to open-switch position, the axis of said plunger lying in a plane normal to the post axis, a bracket having means for mounting the same on the post, a plate connected to and confined to up and down movement relative to the second bracket in planes substantially parallel to the post axis, said plate having a portion arranged to depress said plunger to closed-switch position pursuant to shift of the post to reverse gear position, said plate having an upper marginal flange projecting from said portion in the direction of plunger-depressing movement of said portion, said flange being arranged to engage the upper side of said plunger to retain said portion in closed-switch plunger-depressing position notwithstanding downward settling of the post while in reverse gear position, spring means biasing said portion downward relative to said second bracket to a bottom position in which said portion is arranged to depress said plunger pursuant to shift of the post to reverse gear position, said spring means maintaining said portion in said bottom position when the post is being shifted to second gear position, and means for stopping said plate in said bottom position, said plate and second bracket being arranged so as to pass below and clear of said plunger as the post is shifted to second gear position.

7. In a motor vehicle having a steering column, a gear shift post extending alongside the column, and a gear shift lever connected to the post, the post being rockable about its axis and reciprocable along its axis in response to corresponding movements of the lever, the lever and post being adapted to settle downward slightly upon completion of the shift to reverse gear position: a bracket having means for mounting the same on the column, a switch carried by said bracket and including a plunger spring-biased to open-switch position, the axis of said plunger lying in a plane normal to the post axis, a bracket having means for mounting the same on the post, a plate connected to and confined to up and down movement relative to the second bracket in planes substantially parallel to the post axis, said plate having a portion arranged to depress said plunger to closed-switch position pursuant to shift of the post to reverse gear position, said plate having an upper marginal flange projecting from said portion in the direction of plunger-depressing movement of said portion, said flange being arranged to engage the upper side of said plunger to retain said portion in closed-switch plunger-depressing position notwithstanding downward settling of the post while in reverse gear position, spring means biasing said portion downward relative to said second bracket to a bottom position in which said portion is arranged to depress said plunger pursuant to shift of the post to reverse gear position, said spring means maintaining said portion in said bottom position when the post is being shifted to second gear position, said plate having a lug arranged to engage an upwardly-facing part of said second bracket to prevent downward movement of said plate relative to said second bracket beyond said bottom position, said plate and second bracket being arranged so as to pass below and clear of said plunger as the post is shifted to second gear position.

8. The structure set forth in claim 7, said spring means being anchored to said second bracket and said lug.

9. In a motor vehicle having a steering column, a gear shift post extending alongside the column, and a gear shift lever connected to the post, the post being rockable about its axis and reciprocable along its axis in response to corresponding movements of the lever, the post being adapted to settle downward slightly upon completion of the shift to reverse gear position: a bracket having means for mounting the same on the column, a switch carried by said bracket and including a plunger spring-biased to open-switch position, the axis of said plunger lying in a plane normal to the post axis, a bracket having means for mounting the same on the post, a plate pivoted to and confined to substantially up and down swinging movement relative to the second bracket in planes substantially parallel to the post axis, said plate having a portion arranged to depress said plunger to closed-switch position pursuant to shift of the post to reverse gear position, said plate having an upper marginal flange projecting from said portion in the direction of plunger-depressing movement of said portion, said flange being arranged to engage the upper side of said plunger to retain said portion in closed-switch plunger-depressing position notwithstanding downward settling of the post while in reverse gear position, a spring biasing said portion downward relative to said second bracket to a bottom position in which said portion is arranged to depress said plunger pursuant to shift of the post to reverse gear position, said spring maintaining said portion in said bottom position when the post is being shifted to second gear position, said plate having a lug arranged to engage an upwardly-facing part of said second bracket to prevent downward movement of said portion relative to said second bracket beyond said bottom position, said plate and second bracket being arranged so as to pass below and clear of said plunger as the post is shifted to second gear position, said spring being anchored to said second bracket and said lug, said second bracket backing said portion throughout depression of said plunger.

References Cited in the file of this patent

UNITED STATES PATENTS

| | | |
|---|---|---|
| 1,394,046 | Swaney | Oct. 18, 1921 |
| 1,808,316 | Osgian | June 2, 1931 |
| 1,846,513 | Douglas | Feb. 23, 1932 |
| 1,919,206 | Douglas | July 25, 1933 |
| 2,179,368 | Baade | Nov. 7, 1939 |
| 2,584,477 | Lindenmuth | Feb. 5, 1952 |